(No Model.)

W. H. RAWE.
BALL COCK.

No. 535,922. Patented Mar. 19, 1895.

WITNESSES:
A. D. Harrison.
Rollin Abell.

INVENTOR:
Wm. H. Rawe,
By Wright, Brown & Crossley
Attys.

THE NORRIS PETERS CO., PHOTO-LITHO., WASHINGTON, D. C.

UNITED STATES PATENT OFFICE.

WILLIAM H. RAWE, OF PAWTUCKET, RHODE ISLAND, ASSIGNOR OF ONE-HALF TO THE PAWTUCKET STEAM AND GAS PIPE COMPANY, OF SAME PLACE.

BALL-COCK.

SPECIFICATION forming part of Letters Patent No. 535,922, dated March 19, 1895.

Application filed March 30, 1894. Serial No. 505,702. (No model.)

*To all whom it may concern:*

Be it known that I, WILLIAM H. RAWE, of Pawtucket, in the county of Providence and State of Rhode Island, have invented certain new and useful Improvements in Ball-Cocks, of which the following is a specification.

This invention has for its object the provision of such improvements in ball-cocks as will render the same more efficient and certain in their operation, and more durable and ready of adjustment than has heretofore been the case with devices of this kind.

The invention will first be described in detail and subsequently pointed out with particularity in the appended claims.

Reference is to be had to the accompanying drawings, and to the letters of reference marked thereon, forming a part of this specification, like letters designating like parts or features, as the case may be, wherever they occur.

Figure 1:
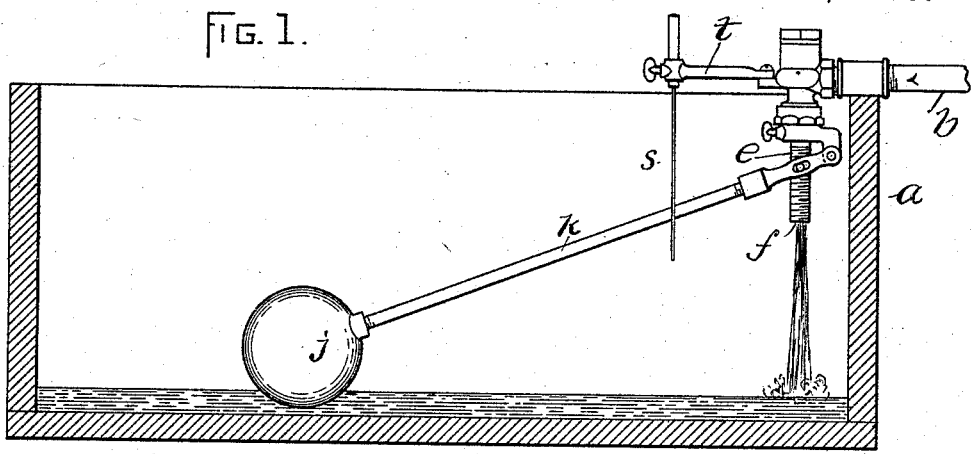
Figure 2:
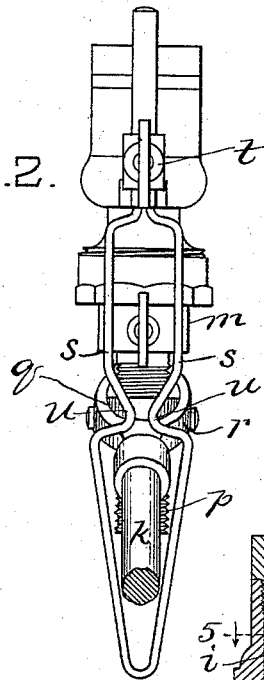
Figure 3:
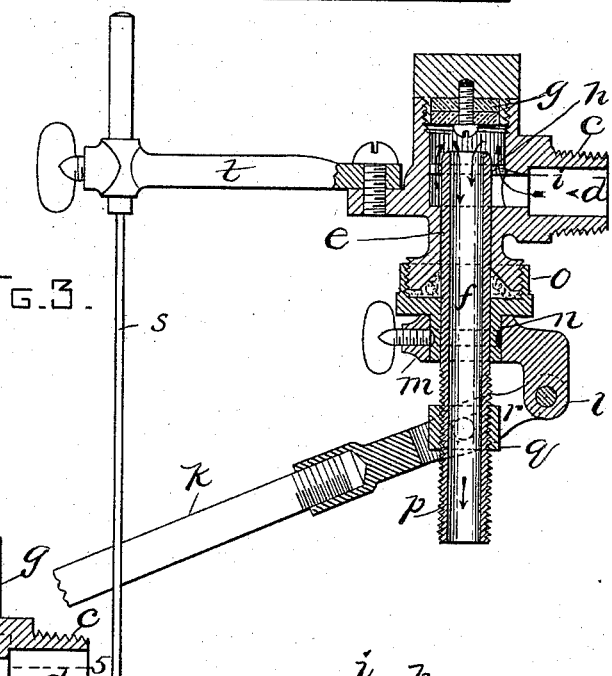
Figure 4:
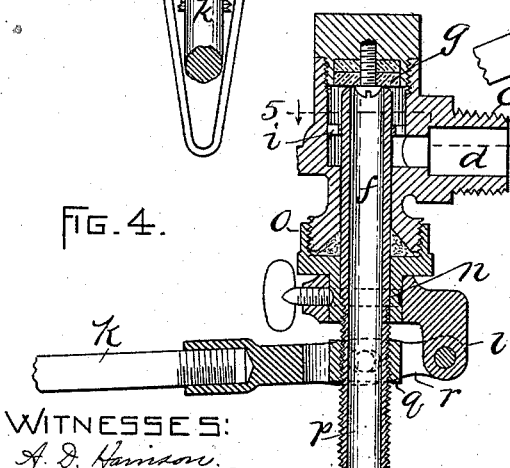
Figure 5:
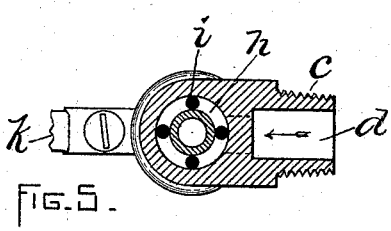

Of the drawings, which show one form of means adapted to the embodiment of the invention, Figure 1 is a side view of the device applied to a tank or cistern, the tank being represented as in section. Fig. 2 is a front view of the device. Fig. 3 is a vertical sectional view showing the cock as open. Fig. 4 is a similar view showing the cock closed. Fig. 5 is a sectional detail view taken on the line 5—5 of Fig. 4.

In the drawings $a$ designates a tank or cistern, and, $b$, a pipe for supplying water to the tank.

In the form of the invention shown in the drawings it is adapted to be immediately coupled or connected with the inflow pipe, $b$, by means of a screw-threaded part, $c$, through which the supply port, $d$, is formed.

$e$ designates the cock proper, which in addition to being operative to shut off and turn on the water is provided with the outflow port, $f$, through which water is delivered to the tank, $a$. The cock, $e$, is constructed as a tube or pipe, and is by preference arranged so as to be reciprocated vertically in suitable bearings, and to co-operate at its upper end with a suitable valve seat, $g$, the latter facing downward.

The water flowing in through the supply port, $d$, passes up through a strainer consisting of a diaphragm or partition, $h$, provided with numerous holes, $i$, as is best seen in Fig. 5. After passing through the strainer the water flows over the top of the cock, $f$, and through the same, as shown in Fig. 1 and indicated by the arrows in Fig. 3.

$j$ designates the ball or float, and, $k$, the rod or lever connected therewith and pivoted at its upper end upon a bracket or ear, $l$, of a collar, $m$, circumferentially adjustable on the hub, $n$, of the packing nut, $o$.

The lower end of the cock-tube, $f$, is screw-threaded, as at $p$, and a nut, $q$, is turned thereon, upon which the lever, $k$, is fulcrumed, the upper end of said lever being constructed as a yoke, $r$, embracing the nut, $q$, and having a loose pivotal connection therewith, as shown.

The collar, $m$, has a set-screw connection with the hub, $n$, and by this means and the construction and relationship of the parts, the collar can be adjusted in any position circumferentially upon the hub, $n$, so as that the arm or lever, $k$, may extend in any direction with respect to other parts of the contrivance. The yoke-nut, $q$, also permits of any radial adjustment of the lever, $k$, and besides, it provides means for the vertical adjustment of the fulcrum of the said lever and so regulate the amount of water allowed to flow into the tank. This is an important feature of the invention.

To provide for a quick closing of the cock and yet have a full flow of water until it is shut, I produce means for arresting the upward movement of the ball by the buoyancy of the water before said ball has reached the limit of its upward movement, and then when pressed quite hard to overcome the resistance to its movement and rise suddenly, quickly closing the cock. This resistance to the movement of the upward movement of the ball and its arm or lever may be accomplished by a plunger working in a cylinder, or the like, or by a spring. A form of the latter means is shown in the drawings in which the spring consists of two arms, $a$, adjustably secured at their upper end to a rod, $t$, adjustably connected to the device. The arms of the spring are bent inward at a proper point, as at, $u$, so as to form wide ways above and below the point, $u$, for the free movement of the lever, $l$, which extends between the said arms, but be resisted to a predetermined degree in passing between the inwardly bent points, $u$. With this construction as the water in the tank runs out the weight of the ball will carry the lever, $k$, down between the arms of the spring, and when the tank fills the ball will rise until resisted at the narrow neck, $u$. The tank will continue to fill until the buoyant power exerted upon the ball will force the lever through the neck and close the cock quickly.

By constructing the cock as a tube, as described, water-hammer and back-lash is avoided, the pressure upon the cock being practically nothing.

By constructing and locating the valve seat as described prevents chips and dirt from accumulating upon the same, and thus preventing the proper operation of the cock and seat, and the strainer contributes also to the prevention of obstructions entering the cock.

Having thus described the invention and explained a way of constructing and using the same, though without attempting to set forth all of the forms in which it may be embodied or all of the modes of its use, it is declared that what is claimed is—

1. A ball cock comprising in its construction a cock proper consisting of a longitudinally and vertically movable tube constituting the outflow port, and having its lower part externally screw-threaded, a seat against which the upper end of the tubular cock is adapted to rest, a ball-lever, provided with a ball, a collar circumferentially adjustable on the cock to which the ball-lever is pivoted, and a screw-threaded nut or collar turned upon the screw-threaded part of the cock to vertically and circumferentially adjust the same thereon, the said ball-lever being also pivoted upon the said nut or collar.

2. A ball-cock comprising in its construction a ball-lever, and spring-arms between which the said ball-lever rises and falls, the said spring-arms having a contracted portion to resist to a limited degree the rise and fall of the lever between the extreme limits of its movement.

In testimony whereof I have signed my name to this specification, in the presence of two subscribing witnesses, this 23d day of March, A. D. 1894.

WILLIAM H. RAWE.

Witnesses:
GEORGE L. COLLINS,
WM. C. FALES.